(12) United States Patent  (10) Patent No.: US 7,188,084 B2
Starkman  (45) Date of Patent: Mar. 6, 2007

(54) METHODS AND SYSTEMS FOR DETERMINING ROLL RATES OF LOANS

(75) Inventor: Hartley C. Starkman, Stamford, CT (US)

(73) Assignee: General Electric Capital Corporation, Stamford, CT (US)

( * ) Notice: Subject to any disclaimer, the term of this patent is extended or adjusted under 35 U.S.C. 154(b) by 519 days.

(21) Appl. No.: 09/751,900

(22) Filed: Dec. 29, 2000

(65) Prior Publication Data
US 2001/0032159 A1 Oct. 18, 2001

Related U.S. Application Data

(60) Provisional application No. 60/173,902, filed on Dec. 29, 1999.

(51) Int. Cl.
*G06Q 40/00* (2006.01)
(52) U.S. Cl. ............................. 705/38; 705/35
(58) Field of Classification Search .............. 705/39, 705/35, 37, 38
See application file for complete search history.

(56) References Cited

U.S. PATENT DOCUMENTS

| | | | |
|---|---|---|---|
| 5,477,334 A | 12/1995 | Keswani et al. | |
| 5,483,445 A | 1/1996 | Pickering | |
| 5,640,835 A | 6/1997 | Muscoplat | |
| 5,644,726 A | 7/1997 | Oppenheimer | |
| 5,684,965 A | 11/1997 | Pickering | |
| 5,878,404 A * | 3/1999 | Stout | 705/38 |
| 5,930,775 A | 7/1999 | McCauley et al. | |
| 5,946,667 A | 8/1999 | Tull, Jr. et al. | |
| 6,038,550 A * | 3/2000 | Rosenwald | 705/35 |
| 6,052,674 A | 4/2000 | Zervides et al. | |
| 6,067,533 A * | 5/2000 | McCauley | 705/38 |
| 6,092,056 A | 7/2000 | Tull, Jr. et al. | |
| 6,119,103 A | 9/2000 | Basch et al. | |
| 6,185,543 B1 | 2/2001 | Galperin et al. | |
| 6,249,775 B1 | 6/2001 | Freeman et al. | |
| 6,456,983 B1 * | 9/2002 | Keyes | 705/36 |
| 6,658,393 B1 * | 12/2003 | Basch | 705/38 |

* cited by examiner

*Primary Examiner*—Jagdish N Patel
(74) *Attorney, Agent, or Firm*—Armstrong Teasdale LLP (57) ABSTRACT

The present invention, in one aspect, relates to tools for forecasting cash flow and income from a collateral based loan portfolio that are particularly useful in volatile markets. In one specific embodiment, consumer payment behavior is modeled, and account movement is simulated. For each month, actual payment amounts can be compared to delinquency, and frequency of payment can be compared to delinquency. Actual performance is then applied to current contractual payments for forecasting. In addition, the models facilitate determination of where payments are coming from, i.e., who is paying.

31 Claims, 4 Drawing Sheets

METHODS AND SYSTEMS FOR DETERMINING ROLL RATES OF LOANS

CROSS REFERENCE TO RELATED APPLICATIONS

This application claims the benefit of U.S. Provisional Application No. 60/173,902, filed Dec. 29, 1999, which is hereby incorporated by reference in its entirety.

BACKGROUND OF THE INVENTION

This invention relates generally to loans, and more specifically, to managing such loans, both collateral based and non-collateral based, including predicting cash inflow, expenses and income.

Determining whether to acquire a portfolio of collateral based loans requires determining a value of the portfolio. The portfolio typically has an initial value, and over a period of time, e.g., 5 years, most all of the loans should be paid off. The value of the portfolio is directly related to how quickly the loans will be paid off, i.e., cash flow, and how much income will be generated from the portfolio.

The analysis required in order to determine the initial value, cash flow, and income can be difficult and tedious. For example, each loan must be analyzed and information regarding each borrower (e.g., payment history) must be considered in determining whether, or how likely it is, that the borrower will make a payment in any given month. In a loan portfolio including several thousand loans, such analysis is time consuming.

Also, in volatile markets which are not very predictable and in which less than complete data is available, predicting collections of loans is more difficult than in more stable markets. Collateral based loan portfolios, however, sometimes become available for purchase in more volatile markets. Using models for stable markets in valuing a distressed portfolio in a volatile market may result in significantly over-valuing the distressed portfolio.

BRIEF SUMMARY OF THE INVENTION

The present invention, in one aspect, relates to tools for forecasting cash flow and income from a collateral based loan portfolio that are particularly useful in volatile markets. In one specific embodiment, consumer payment behavior is modeled, and account movement is simulated for distressed assets. For each month, actual payment amounts are analyzed by delinquency, and frequency of payment is analyzed by, for example, asset type and region for delinquency. Actual performance is then applied to current contractual payments for forecasting thereby allowing for changing assumptions (i.e. going forward) and determination of roll rates. In addition, the models facilitate determination of where payments are coming from, i.e. (who is paying).

DETAILED DESCRIPTION OF THE INVENTION

The present invention is described herein in the context of collateral-based loans, and sometimes is described specifically with respect to automobile based loans. The present invention, however, can be utilized in many different contexts for other types of loans. Therefore, it should be understood that the present invention is not limited to practice with automobile based loans, or collateral-based loans.

In addition, the models described herein are particularly useful in volatile markets for managing distressed loan portfolios. Models that have been developed for more stable markets where more complete data is available are certainly suitable for such stable markets. However, and as explained above, such models are not necessarily applicable to distressed loan portfolios in volatile markets.

Volatile markets are markets which reflect changes in loan delinquencies based on one or more event occurances. Examples would include changes in the political climate, large interest rate changes and natural disasters. The models are flexible enough to calculate probabilities of such events and predict results. For example, in a auto loan scenario, if a natural disaster such as a flood occurred, some number collateral assets are likely to be lost, thereby resulting in both a decrease in loan collections and a rapid depreciation of the vehicles affected.

Other events are also incorporated into the models, for example, where the collateral is located affects speed of depreciation and cost of repossession. In addition, all of the above are used in determining collection employee workload, since the model is used to predict when and where delinquent accounts are likely to occur.

Further, the models and work sheets described herein can be practiced on many different computer systems. For example, the models and work sheets can be implemented on a lap top computer including a Pentium II processor. The particular computer on which the models and work sheets are implemented can be selected based on the processing speed desired, as well as the memory space needed due to the size of the portfolio and the extent of the models and work sheets to be generated.

With respect to understanding a portfolio of collateral based loans, it is desirable to understand where the payments are being made, to project future inventory trends, and to visualize changes in delinquency and predict event occurances. The present invention meets each of these needs. Specifically, tools for forecasting timing of cash inflow from a collateral-based loan portfolio, including modeling consumer payment behavior and account movement, are described. Using the tools described herein, and each month, actual payment amount can be compared to delinquency, and frequency of payment can be compared to delinquency. Actual performance is then applied to current contractual payments in order to predict cash inflow.

Figure 1:
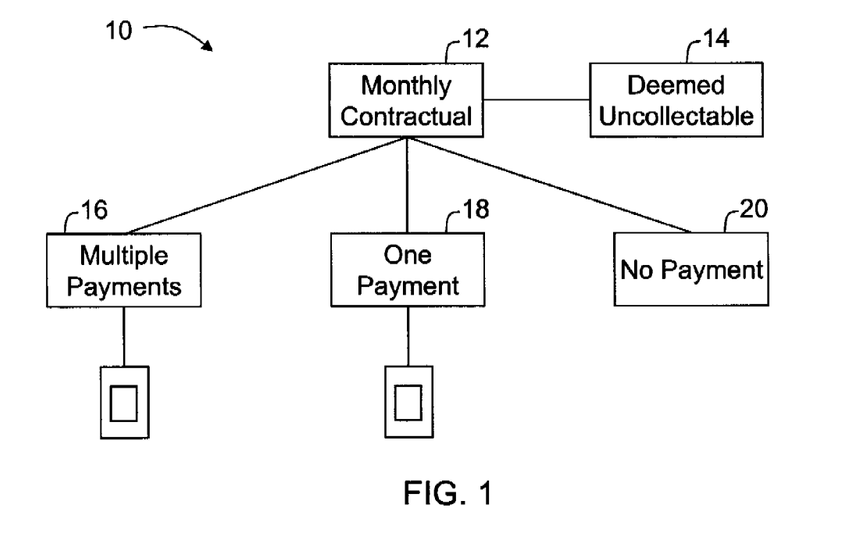
FIG. 1 illustrates a collections model.

More specifically, and in one embodiment, a collateral-based loan management system includes a collections model and a re-marketing model. A collections model 10 is illustrated in FIG. 1. Collections model 10 sometimes is referred to as a "recency model" since model 10 provides data by looking at a last payment date to predict future payment behavior.

As shown in FIG. 1, collections model 10 includes a category of loans defined as "monthly contractual" 12. Such loans are ones in which a monthly payment is due, e.g., a monthly payment for an automobile loan. Another category of loans is defined as "deemed uncollectable" 14. Such loans are "monthly contractual" loans in that no payment is expected, one example is very delinquent loans. Although the descriptions herein use "monthly contractual" 12 loans to describe model 10, model 10 is not so limited. Model 10 is also used to predict payment behavior using delinquency measures, including, but not limited to, contractual, trailing 90 days (which is looking at only three months of behavior at one time, and for each month forward, looking at the most recent three months of data), trailing 180 days (same as trailing 90 days, but with six month periods), and last payment date.

Within "monthly contractual" loans 12, there are loans which, for any particular month, multiple payments 16 have been made, one payment 18 has been made, and no payment 20 has been made. Multiple payments may be made, for example, if a loan customer has not made a payment for multiple past months and then submits a payment for more than one month. One payment may be made, for example, by customers who are current on their loan payments. Alternatively, one payment may be made by someone who has not made payments for multiple past months and then submits payment for one month. Such an account is deemed irregular or sporadic. The "no payment" category refers, of course, to customers who make no payment during that particular month. Each monthly contractual type loan that is not "deemed uncollectable" can be grouped in one of the categories as shown in FIG. 1.

When a particular loan portfolio is acquired, the acquisition of the loans by a new loan manager can result in customers starting to pay on loans that are then delinquent. Therefore, in determining delinquency, the number of days delinquent may be determined from the date of the acquisition of the portfolio by the new loan manager. Alternatively, the delinquency may be determined simply based on the contract terms and when the last payment was made.

Collections model 10 is used to forecast monthly cash inflow by predicting, for example, consumer payment behavior based on historical information combined with assumptions about potential changes in the future. Such prediction is based on payment amount versus contractual delinquency, and measuring frequency of payment by delinquency.

In one specific embodiment, delinquency is determined for each account. In the one specific embodiment, accounts that are 0–12 months delinquent are categorized by delinquency (e.g., a separate category is provided for each of month 0 through month 12). For accounts greater than 18 months delinquent, such accounts are captured in one category, i.e., >18 months delinquent. Each category is sometimes referred to herein as a "bucket". For example, if there are 1,000 loans that are 3 months delinquent, then there are 1,000 loans in the 3 month delinquent bucket.

The contractual obligations for each bucket are then determined. For example, for the 3 month delinquent bucket, there may be a total of $1,000,000 in payments that are contractually due for one month. The amortization rate also is determined for each bucket. Amortization rates change for each month as behavior changes. For example, customer loans are rolling forward and rolling back, thus the customers in each bucket change from month to month, as does behavior, changes to the amortization rates reflect changes in customer behavior.

Each prior month performance is then analyzed on an account by account basis and grouped by asset type. Then, payments are compared to contractual obligation and to projected amount grouped by bucket. Recent performance is then compared to prior performance, and in one embodiment, greater weights are assigned to recent performance. Changes in performance are reported to management to allow for changes in collection strategies. The assumptions for collections are then applied for expectations on future performance. A model reflecting the new information can then be generated to predict future cash flow.

Figure 2:
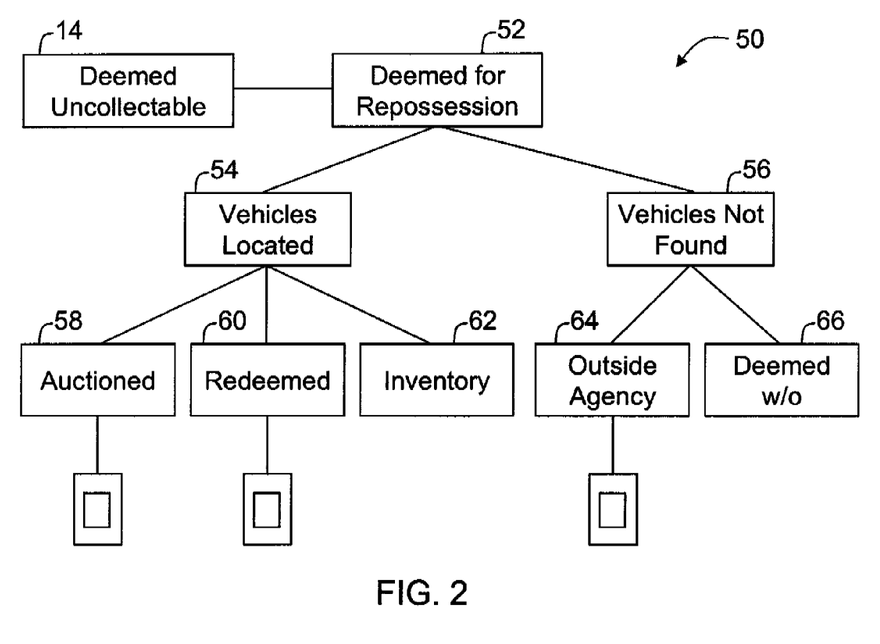
FIG. 2 illustrates a re-marketing model.

FIG. 2 illustrates a re-marketing model 50. Model 50 is based on those loans "deemed uncollectable" 14 in collections model 10. Once deemed uncollectable 14, then repossession of the collateral 52 against which the loan is secured is pursued, e.g., repossess an automobile that is collateral for an automobile loan. With respect to automobiles, or vehicles, such vehicles generally are within two categories. That is, either the vehicle is located 54 or the vehicle is not found 56. If the vehicle is located 54, then the vehicle can be auctioned 58, redeemed 60, or placed in inventory 62. If the vehicle is not found 56, then an outside agency 64 can be engaged to locate the vehicle or the particular loan can be written-off 66.

Re-marketing model 50 is particularly useful in capacity planning. For example, and with respect to vehicles, if a large number of vehicles are to be repossessed, then planning must be done to store such vehicles as well as to sell the vehicles. In addition, model 50 can be utilized in forming a basis for predicting the value of vehicles to be repossessed and sold, as well as the timing of such activities.

Modeling loan information using collections model 10 and re-marketing model 50 described above facilitates an understanding of the portfolio and assists in visualizing delinquencies. In addition to the models described above, a spread sheet format can be utilized visualize other meaningful data associated with a loan portfolio, e.g., to determine predictability of collections.

Figure 3:
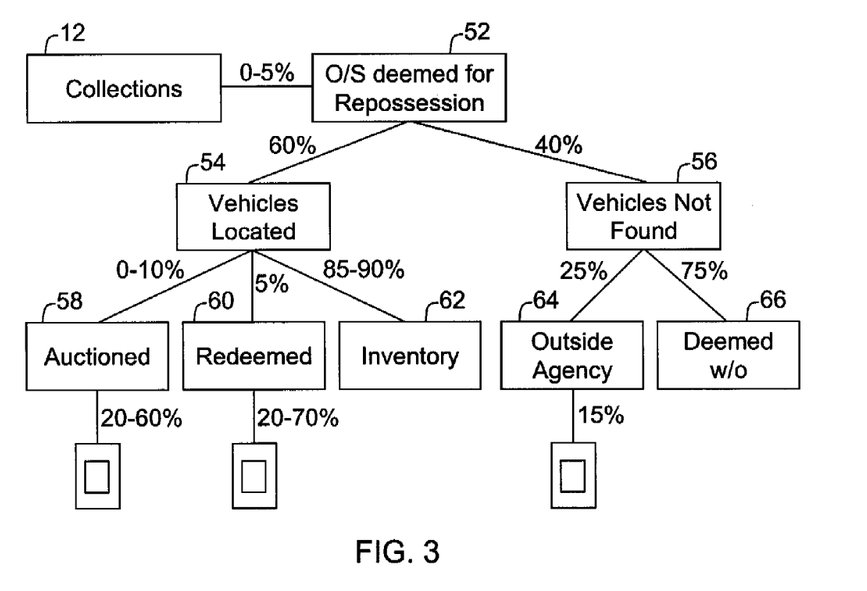
FIG. 3 illustrates a re-marketing model including assumptions.

FIG. 3 illustrates exemplary assumptions for re-marketing. Similar assumptions are assigned for collections model, and the assumptions illustrated in FIG. 3 are only by way of example. More specifically, and referring to FIG. 3, it is assumed that 0–5% of all loans 12 will be deemed for repossession 52. Vehicles will be located 54 for 60% of the loans for repossession 52, and 40% of the vehicles will not be found 56. With respect to the vehicles located 54, 0–10% will be auctioned 58, 5% will be redeemed 60, and 85–90% will go into inventory 62. Of those vehicles to be auctioned 58, 20–60% will actually be auctioned, and of those vehicles to be redeemed 60, 20–70% will actually be redeemed.

With respect to the vehicles not found 56, in one embodiment about 25% will be assigned to an outside agency for location 64, and about 75% will be written off 66. Of those vehicles assigned to an outside agency 64, 15% will actually be found. Again the percentage values used herein are those used in one embodiment and are for illustration only.

The assumptions represented in FIG. 3 can be updated from month to month to more accurately reflect current data. The percentage assumptions described above are one example only and percentages change based on other external factors. Using the assumptions, cash flow predictions can be made based on those vehicles deemed for repossession 52. A similar process is followed with respect to collections to make a total cash flow estimate for a particular month.

Figure 4:
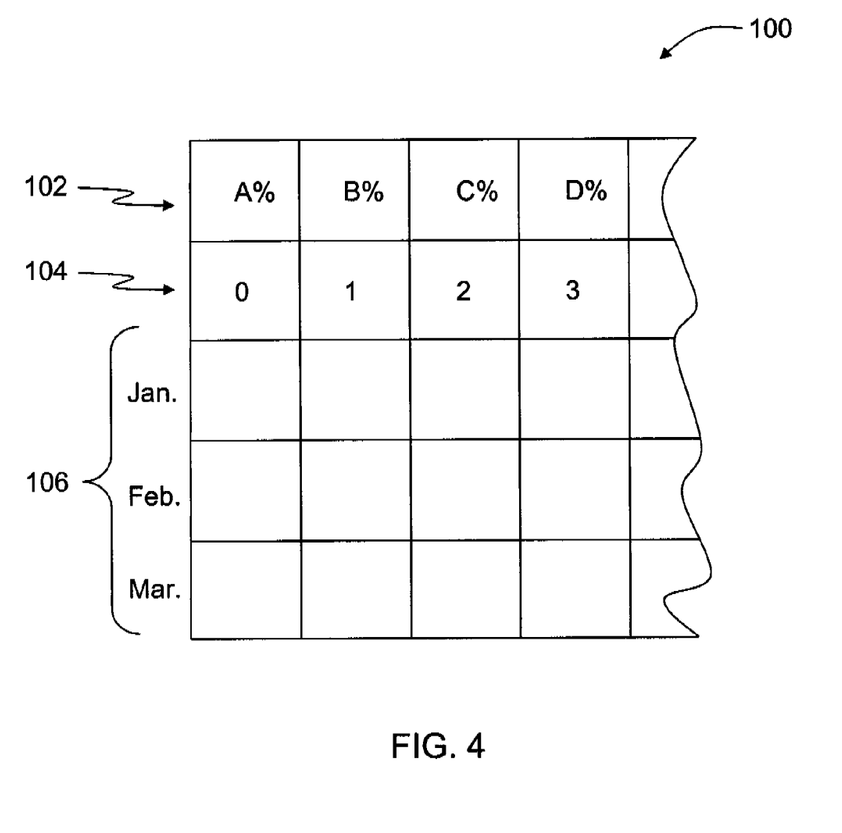
FIG. 4 is a portion of an exemplary work sheet for predicting delinquency.

FIG. 4 is a portion of an exemplary work sheet 100 for predicting delinquency. Although delinquency work sheet 100 is described herein in detail, similar work sheets can be generated for other information of importance such as gross value, stock (i.e., book value of vehicles to be repossessed), roll forward, roll back, payoff, and payment. Roll forward means an account that will become delinquent, or one more month delinquent, due to failure to make a payment. Roll back means that a payment is made on an overdue payment, e.g., if three months delinquent and make two payments (i.e., the current payment and one delinquent payment), then this represents a roll back of one.

Exemplary work sheet 100 shown in FIG. 4 is generated using Microsoft Excel, Access, and Crystal Ball Application, which is used in the Excel environment to assign probability distributions to the assumptions. Of course, other commercially available software can be utilized in generating such work sheets.

Referring now specifically to FIG. 4, and in a first column 102, percentages are shown, i.e., A %, B %, C %, D %. These percentages indicate a probability that an account will roll forward into a next month of delinquency. A second column 104 indicates the number of months that an account is delinquent. For example, the "0" column is for accounts that are zero months delinquent, and the "1" column is for accounts that are one month delinquent. Delinquency is captured in this format for each month 106.

By capturing delinquency in this manner, a prediction can be made with respect to which accounts, or buckets, by value will roll forward into the next bucket of delinquency. In addition, the assumptions for any particular month can be adjusted to account for variations due, for example, to seasonal behavior. For example, in some countries, it may be highly unlikely that many payments will be received during hurricane season. The assumptions, or probabilities, can be adjusted to reflect this seasonal variability.

Contrasted to a calculation of a gross roll rate, which is calculated by looking at an entire portfolio for total delinquency (in value or other units) for a period, for example, 60 days late in month B, and determining what percentage of those delinquencies are carried over from 30 days late in month A. The problem with such a determination of roll rate is that it does not take into account delinquencies that may have been more than 90 days delinquent, but have applied payments to get those accounts paid up to where they are now only 60 days late.

Roll rate as used herein is calculated by a determination of the value of each loan, in aggregate, that has rolled forward from, for example, 30 days delinquent to 60 days delinquent, that is, determining those accounts that did not pay. Alternatively, some accounts may roll back, that is, a 90 day delinquent loan may receive two payments in a month, thereby rolling back to 60 days late. Determination of roll back and roll forward help in aligning collectors and collection efforts by using model 10, to predict which buckets accounts will be in. Prediction of which buckets accounts will be located, allows allocation of collectors for each level of delinquency and allows focus of collection efforts as continued deterioration of the portfolio occurs.

Again, and as explained above, work sheet 100 shown in FIG. 4 is an exemplary work sheet for predicting delinquency, and similar work sheets can be generated for other information of importance such as gross value, stock (i.e., book value of vehicles to be repossessed), roll forward, roll back (e.g., roll back 1, roll back 2, roll back 3, payoff), and payment. These work sheets facilitate visualizing delinquency as well as cash flow and income.

Work sheet 100, as well as other work sheets which can be generated in a similar manner as described above, are sometimes referred to as delinquency-moving matrices. Use of such delinquency-moving matrices facilitates a better understanding of a portfolio and timing as to when payments will be made, i.e., cash inflow. In addition, an initial portfolio value can be easily generated by summing the matrices for collections, re-marketing, losses, and outstanding amounts due.

Further, and as shown with respect to work sheet 100, rather than looking at an entire portfolio in the aggregate to determine roll rate, with work sheet 100, roll rate is determined based on the behavior of each account on an account-by-account level. Such a more granular approach to roll rate facilitates more accurate estimates with respect to payments, and also facilitates a better understanding as to where the payments are coming from.

Also, the collection model described herein captures multiple payments that may be made on a delinquent account. By capturing the fact that some borrowers may make multiple payments, a more accurate roll rate can be determined, rather than using a gross roll rate as defined above. The model also is configurable to take into account other factors or discrete events which affect payment behaviors. For example, during holiday periods, collections may be only about 95% of normal the reduction in collections are due to multiple factors including collectors taking holiday and more accounts not paying. Other events include, but not limited to, tax incentives which may alter consumer behavior or a political event that may impact the portfolio in the future.

Figure 5:
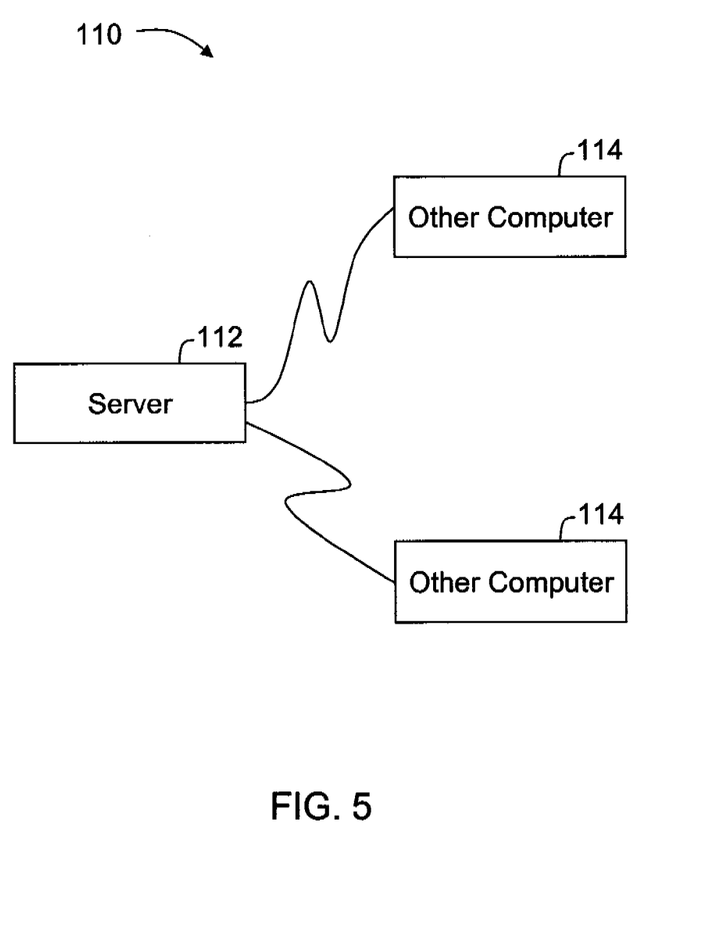
FIG. 5 is a system diagram.

FIG. 5 illustrates an exemplary system 110 in accordance with one embodiment of the present invention. System 110 includes a computer configured as a server 112 and a plurality of other computers 114 coupled to server 112 to form a network. In one embodiment, computers 114 are client systems including a web browser, and server 112 is accessible to computers 114 via the Internet. In addition, server 112 is a computer. Computers 114 are interconnected to the Internet through many interfaces including a network, such as a local area network (LAN) or a wide area network (WAN), dial-in-connections, cable modems and special high-speed ISDN lines. Computers 114 could be any device capable of interconnecting to the Internet including a web-based phone or other web-based connectable equipment, including wireless web and satellite. Server 112 includes database 116 containing loan portfolios and account payment and delinquency information and is further configured to receive and store information regarding loan collection modeling described above. Server 112 can be accessed by users at one of computers 114 by logging onto server 112 through one of computers 114.

Although the invention has been described and illustrated in detail, it is to be clearly understood that the same is intended by way of illustration and example only and is not to be taken by way of limitation. Accordingly the spirit and scope of the invention are to be limited only by the terms of the appended claims and their equivalents.

What is claimed is:

1. A method for managing a distressed loan portfolio using roll rates for a group of non-stationary asset-based loans utilizing a computer, the group of non-stationary asset-based loans included within the distressed loan portfolio, said method comprising the steps of:

(a) predicting a payment behavior for a borrower of a non-stationary asset-based loan included within a distressed loan portfolio utilizing a collections model wherein the payment behavior includes whether the borrower will submit a timely payment and a payment amount relative to a contractual delinquency for the associated loan, wherein the collections model is based on historical payment information of the borrower and a plurality of collection strategies for collecting payment from the borrower, and wherein the non-stationary asset based loans include at least one of automobile loans, vehicle loans, and credit card loans;

(b) initiating at least one of the plurality of collection strategies with respect to the borrower and the payment of the associated loan;

(c) analyzing the borrower's payment behavior after initiating the at least one collection strategy;

(d) comparing the borrower's payment behavior after initiating the at least one collection strategy to the predicted payment behavior of the borrower;

(e) updating the collections model based on the borrower's payment behavior comparison;

(f) calculating with a computer an amount generated and expenses incurred from repossessing a non-stationary asset used as collateral for the borrower's loan utilizing a re-marketing model, the re-marketing model further calculates a probability that an event will occur impacting payment of the borrower's loan;

(g) generating delinquency moving matrices that include the borrower's loan to facilitate predicting roll rates;

(h) predicting a roll rate into a next level of delinquency for the borrower and the associated loan using the updated collections model, the calculated amount generated and expenses incurred, and the calculated probability that an event will occur that is calculated by the re-marketing model;

(i) repeating steps (a)–(h) for each loan included within the group of non-stationary asset-based loans; and (j) managing the loan portfolio by forecasting cash flow for the loan portfolio based on the predicted roll rate of each loan included within the group of non-stationary asset-based loans.

2. A method according to claim 1 wherein said step of predicting a roll rate into a next level of delinquency further comprises the step of determining estimates with respect to payments.

3. A method according to claim 1 wherein said step of generating delinquency moving matrices further comprises the step of assigning probability distributions to loan delinquency assumptions.

4. A method according to claim 1 wherein said step of predicting a roll rate into a next level of delinquency further comprises the step of analyzing loans that roll forward into a next period of delinquency, due to non-payment.

5. A method according to claim 4 wherein said step of analyzing loans that roll forward into a next period of delinquency further comprises the step of calculating a delinquency value that has increased from a first period to a second period.

6. A method according to claim 1 wherein said step of predicting a roll rate into a next level of delinquency further comprises the step of analyzing loans that roll back one or more periods of delinquency, due to extra received payment.

7. A method according to claim 1 wherein said step of repeating steps further comprises predicting the loans in the group of loans that will be rolled forward into an n-month delinquency, wherein n is an integer greater tan zero and represents a number of months for which one of the customers has been delinquent in making a payment.

8. A method according to claim 1 wherein said step of calculating with a computer further comprises calculating with a computer, utilizing the re-marketing model, a probability that an event will occur impacting payment of the borrower's loan wherein the event includes at least one of a change in political climate, an increase in interest rate, and a natural disaster.

9. A method according to claim 1 wherein predicting a payment behavior for a borrower further comprises predicting a payment behavior for a borrower of a non stationary asset-based loan included within a distressed loan portfolio utilizing a collections model that is based on historical payment information of the borrower, wherein the historical payment information of the borrower includes information relating to the payment of the loan by the borrower for a period of no more than six-months prior to a last payment due date of the loan.

10. A method according to claim 1 further comprising the step of initiating another collection strategy with respect to the borrower when after initiating the at least one of the plurality of collection strategies the borrower's payment behavior does not correspond with the borrower's predicted payment behavior.

11. A system for managing a distressed loan portfolio using roll rates for a group of non-stationary asset-based loans, the group of non-stationary asset-based loans included within the distressed loan portfolio, said system comprising:

at least one computer;

a server configured with a roll rate determination model including a collections model and a re-marketing model, said server configured to:

(a) predict, by accessing the collections model, a payment behavior for a borrower of a non-stationary asset based loan included within the distressed loan portfolio wherein the payment behavior includes whether the borrower will submit a timely payment and a payment amount relative to a contractual delinquency for the associated loan, wherein the collections model is based on historical payment information of the borrower and a plurality of collection strategies for collecting payment from the borrower, and wherein the non-stationary asset based loans include at least one of automobile loans, vehicle loans, and credit card loans;

(b) analyze, the borrower's payment behavior after initiating at least one of the plurality of collection strategies;

(c) compare the borrower's payment behavior after initiating the at least one collection strategy to the predicted payment behavior of the borrower;

(d) update the collections model based on the borrower's payment behavior comparison;

(e) calculate, by accessing the re-marketing model, an amount generated and expenses incurred from repossessing a non-stationary asset used as collateral for the borrower's loan, the re-marketing model further calculates a probability that an event will occur impacting payment of the borrower's loan;

(f) generate delinquency moving matrices that include the borrower's loan to facilitate predicting roll rates;

(g) predict whether the borrower's loan will roll forward into a next classification of delinquency using the updated collections model, the calculated amount generated and expenses incurred, and the calculated probability that an event will occur that are calculated by the re-marketing model;

(h) repeat steps (a)–(g) for each loan included within the loan portfolio; and (j) manage the loan portfolio by forecasting cash flow for the loan portfolio based on the predicted roll rate of each loan included within the group of non-stationary asset-based loans; and a network connecting said computer to said server to enable said computer to communicate with said server.

12. A system according to claim 11 wherein said server configured to determine estimates with respect to payments.

13. A system according to claim 11 wherein said server configured to assign probability distributions to loan delinquency assumptions.

14. A system according to claim 11 wherein said server is configured to analyze the loans that roll forward into a next period of delinquency, due to non-payment.

15. A system according to claim 14 wherein said server is configured to calculate a delinquency value that has increased from a first period to a second period for the loans that roll forward into the next period of delinquency.

16. A system according to claim 11 wherein said server is configured to analyze the loans that roll back one or more periods of delinquency, due to extra received payment.

17. A system according to claim 11 wherein said server is configured to predict the loans that will roll forward into an n-month delinquency, wherein n is an integer greater than zero and represents a number of months for which one of the customers has been delinquent in making a payment.

18. A system according to claim 11 wherein said network is at least one of a WAN or a LAN.

19. A system according to claim 11 wherein the event includes at least one of a change in political climate, an increase in interest rate, and a natural disaster.

20. A system according to claim 11 wherein the historical payment information of the borrower includes information relating to the payment of the loan by the borrower for a period of no more than six-months prior to a last payment due date of the loan.

21. A system according to claim 11 wherein said server is configured to prompt a user to initiate another collection strategy with respect to the borrower when after initiating the at least one of the plurality of collection strategies the borrower's payment behavior does not correspond with the borrower's predicted payment behavior.

22. A computer for managing a distressed loan portfolio using roll rates for a group of non-stationary asset-based loans, the group of non-stationary asset-based loans included within the distressed loan portfolio, said computer comprising a processor and programmed to:
  (a) predict, by accessing a collections model, a payment behavior for a borrower of a non-stationary asset-based loan included within the distressed loan portfolio wherein the payment behavior includes whether the borrower will submit a timely payment and a payment amount relative to a contractual delinquency for the associated loan, wherein the collections model is based on historical payment information of the borrower and a plurality of collection strategies for collecting payment from the borrower, and wherein the non-stationary asset based loans include at least one of automobile loans, vehicle loans, and credit card loans;
  (b) analyze the borrower's payment behavior after initiating at least one of the plurality of collection strategies;
  (c) compare the borrower's payment behavior after initiating the at least one collection strategy to the predicted payment behavior of the borrower;
  (d) update the collections model based on the borrower's payment behavior comparison;
  (e) calculate, by accessing the re-marketing model, an amount generated and expenses incurred from repossessing a non-stationary asset used as collateral for the borrower's loan, the re-marketing model further calculates a probability that an event will occur impacting payment of the borrower's loan;
  (f) generate delinquency moving matrices that include the borrower's loan to facilitate predicting roll rates;
  (g) predict whether the borrower's loan will roll forward into a next classification of delinquency using the updated collections model, the calculated amount generated and expenses incurred, and the calculated probability that an event will occur that are calculated by the re-marketing model;
  (h) repeat steps (a)–(g) for each loan included within the loan portfolio; and
  (j) manage the loan portfolio by forecasting cash flow for the loan portfolio based on the predicted roll rate of each loan included within the group of non-stationary asset-based loans.

23. A computer according to claim 22 programmed to determine estimates wit respect to payments.

24. A computer according to claim 22 programmed to assign probability distributions to loan delinquency assumptions.

25. A computer according to claim 22 wherein said computer is programmed to analyze the loans that roll forward into a next period of delinquency, due to non-payment.

26. A computer according to claim 25 wherein said computer is programmed to calculate a delinquency value that has increased from a first period to a second period for the loans that roll forward into a next period of delinquency.

27. A computer according to claim 22 wherein said computer is programmed to analyze the loans that roll back one or more periods of delinquency, due to extra received payment.

28. A computer according to claim 22 wherein said computer is programmed to predict the loans that will roll forward into an n-month delinquency, wherein n is an integer greater than zero and represents a number of months for which one of the customers has been delinquent in making a payment.

29. A computer according to claim 22 wherein the event includes at least one of a change in political climate, an increase in interest rate, and a natural disaster.

30. A computer according to claim 22 wherein the historical payment information of the borrower includes information relating to the payment of the loan by the borrower for a period of no more than six-months prior to a last payment due date of the loan.

31. A computer according to claim 22 wherein said computer is programmed to prompt a user to initiate another collection strategy with respect to the borrower when after initiating the at least one of the plurality of collection strategies the borrower's payment behavior does not correspond with the borrower's predicted payment behavior.

* * * * *

UNITED STATES PATENT AND TRADEMARK OFFICE
CERTIFICATE OF CORRECTION

PATENT NO.         : 7,188,084 B2                                          Page 1 of 1
APPLICATION NO. : 09/751900
DATED              : March 6, 2007
INVENTOR(S)        : Starkman It is certified that error appears in the above-identified patent and that said Letters Patent is hereby corrected as shown below:

In Claim 7, column 7, line 58, delete "tan zero" and insert therefor -- than zero --.
In Claim 11, column 8, line 39, delete "analyze, the" and insert therefor
-- analyze the --.
In Claim 12, column 9, line 4, delete "con figured" and insert therefor -- configured --.
In Claim 22, column 10, line 3, delete "calculate, by" and insert therefor
-- calculate by --.
In Claim 23, column 10, line 24, delete "wit respect" and insert therefor -- with respect --.

Signed and Sealed this

Seventh Day of April, 2009

JOHN DOLL
*Acting Director of the United States Patent and Trademark Office*